United States Patent [19]
Friesz

[11] Patent Number: 4,510,663
[45] Date of Patent: Apr. 16, 1985

[54] METHOD OF INSTALLING MULTI-SECTIONS VERTICALLY ACTING DOORS

[75] Inventor: Robert E. Friesz, Omaha, Nebr.

[73] Assignees: Leo R. Murnan; Omaha Door Company, both of Omaha, Nebr. ; part interest to each

[21] Appl. No.: 459,770

[22] Filed: Jan. 21, 1983

[51] Int. Cl.³ ...................... B21D 39/03; B23P 11/00; B66D 1/36

[52] U.S. Cl. ......................................... 29/429; 29/434; 52/71; 160/199; 254/338

[58] Field of Search ................. 29/429, 428, 434, 469; 16/DIG. 1; 160/405, 199, 201, 206; 49/197; 254/336, 334, 338; 52/71, 64

[56] References Cited

U.S. PATENT DOCUMENTS

| | | | |
|---|---|---|---|
| 168,330 | 10/1875 | Haynes | 254/338 X |
| 539,341 | 5/1895 | Brown | 254/334 X |
| 2,966,212 | 12/1960 | Fimbel, Jr. | 160/201 X |
| 3,347,305 | 10/1967 | Urbanick | 160/201 X |
| 3,402,457 | 9/1968 | Landdow et al. | 29/428 |
| 3,439,728 | 4/1969 | Martini | 160/201 X |
| 3,454,259 | 7/1969 | Faulkner | 254/338 |
| 4,119,133 | 10/1978 | Wolf | 160/201 |
| 4,123,041 | 10/1978 | Bucknall | 29/428 X |
| 4,269,253 | 5/1981 | Ziegler | 160/201 |

*Primary Examiner*—Charlie T. Moon
*Attorney, Agent, or Firm*—George R. Nimmer

[57] ABSTRACT

Multi-sections vertically acting doors of the prior art comprise a plurality of horizontally longitudinally extending sections that are pivotably connected and including rollable engagement with longitudinally separated trackways. Such prior art doors are herein shown to be installed into vertical trackway lengths by a novel hoisting method that permits the installer to remain standing at ground level as all door sections are being sequentially pivotably connected and rollably engaged into the trackways; this novel hoisting method differs from the prior art ladder-method in that the installer is spared having to tediously and repetitively position, climb, descend, and re-position a ladder. The novel hoisting method utilizes a hoisting apparatus including liftcable for progressively hoisting the door top-section as medial-sections of descending numerical order are sequentially pivotably strung from the suspended top-section, and finally the lowermost medial-section is pivotably connected to the bottom-section to complete the door installation.

4 Claims, 6 Drawing Figures

FIG. 2

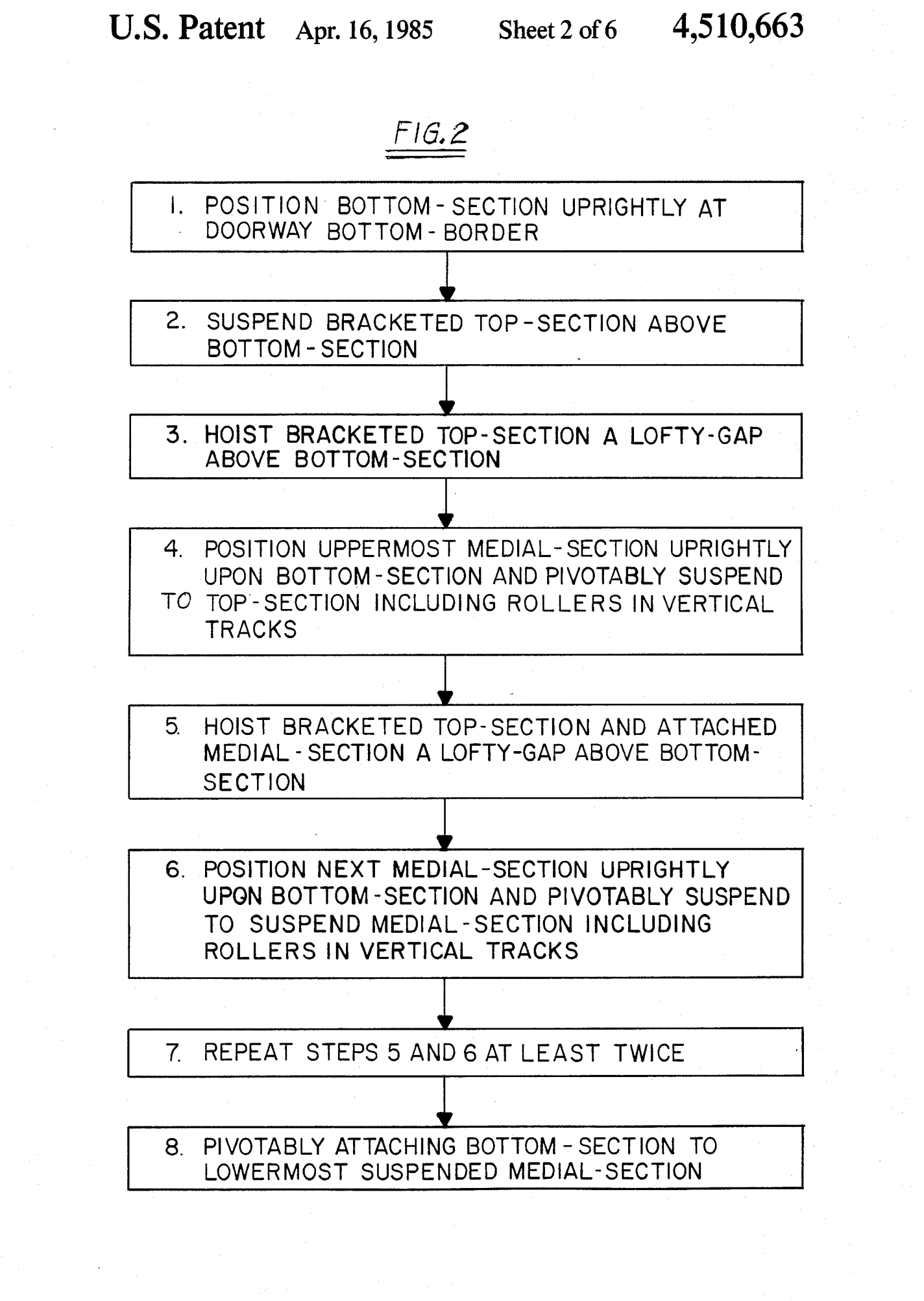

1. POSITION BOTTOM-SECTION UPRIGHTLY AT DOORWAY BOTTOM-BORDER

↓

2. SUSPEND BRACKETED TOP-SECTION ABOVE BOTTOM-SECTION

↓

3. HOIST BRACKETED TOP-SECTION A LOFTY-GAP ABOVE BOTTOM-SECTION

↓

4. POSITION UPPERMOST MEDIAL-SECTION UPRIGHTLY UPON BOTTOM-SECTION AND PIVOTABLY SUSPEND TO TOP-SECTION INCLUDING ROLLERS IN VERTICAL TRACKS

↓

5. HOIST BRACKETED TOP-SECTION AND ATTACHED MEDIAL-SECTION A LOFTY-GAP ABOVE BOTTOM-SECTION

↓

6. POSITION NEXT MEDIAL-SECTION UPRIGHTLY UPON BOTTOM-SECTION AND PIVOTABLY SUSPEND TO SUSPEND MEDIAL-SECTION INCLUDING ROLLERS IN VERTICAL TRACKS

↓

7. REPEAT STEPS 5 AND 6 AT LEAST TWICE

↓

8. PIVOTABLY ATTACHING BOTTOM-SECTION TO LOWERMOST SUSPENDED MEDIAL-SECTION

METHOD OF INSTALLING MULTI-SECTIONS VERTICALLY ACTING DOORS

BACKGROUND OF THE INVENTION

FIG. 1 is an external elevational view of a typical building structure BS having walls (e.g. BW) extending uprightly between floor (BF) and ceiling (BC), a wall (e.g. BW) including an upright rectangular door opening D provided with a multi-sections vertically acting overhead type door of the prior art. Rectangular door opening D is typically defined by longitudinally horizontally extending bottom-border DB at floor level BF, by longitudinally horizontally extending top-border DT at wall header BH, and by longitudinally separated and vertically extending left-border and right-border (D1, D2). Located on the internal side of wall BW and parallel to vertical borders D1 and D2 are the vertical lengths TV1 and TV2 of trackways T1 and T2. The horizontal lengths TH1 and TH2 of trackways T1 and T2 are customarily hung parallel to ceiling BC. The several longitudinally extending panel-like sections (S1 . . . Sn) of door DD are sequentially pivotably attached (P, R) and also rollably engaged (M, N, R) to the respective trackways (T1, T2).

The longitudinally extending door sections are conventionally numbered in consecutive ascending order commencing at bottom-section S1 and ending at top-section Sn. Thus, in the five sections door DD arbitrarily chosen for depiction in FIG. 1, the sections occur as bottom-section S1, three medial-sections (S2, S3, and S4), and top-section S5. At the two vertical ends of bottom-section S1, and to provide rollable engagement with trackway lengths TV1 and TV2, there are lower roller units M1 and M2 and also upper roller-hinges R1; the horizontal upper-edge of bottom-section S1 is pivotably connected to the horizontal lower-edge of lowermost medial-section S2 with two endward roller-hinges R1 and with inboard hinges P1. At the two vertical ends of top-section S5, and to provide rollable engagement with trackways T1 and T2, there are upper roller units N1 and N2 and also lower roller-hinges R4; the horizontal lower-edge of top-section S5 is pivotably connected to the horizontal upper-edge of uppermost medial-section S(n−1) e.g. S4, with two endward roller-hinges R4 and with inboard hinges P4. For the horizontal upper-edges of medial-sections S2, S3, and S4, there are endward roller-hinges R2, R3, and R4, and the respectively co-elevational inboard hinges P2, P3, and P4.

In the door-closed condition (shown in FIG. 1), all door sections are engaged along trackway vertical lengths TV1 and TV2, and hence, all sections are maintained in vertical position. In the door-open condition (not shown), top-section Sn e.g. S5, and most of the descending order sections therebelow are engaged with trackway horizontal lengths TH1 and TH2. Vertical doorcables C1 and C2 are attached to the two lower end corners M1 and M2 of bottom-section S1, said doorcables C1 and C2 lying within trackway vertical lengths TV1 and TV2 and being wound around drums KD1 and KD2, said drums being carried by horizontal shaft K attached at header BH with bearing plates KB1 and KB2. KJ1 and KJ2 refer to torsion springs for drums KD1 and KD2, and SH refers to a lifthandle for bottom-section S1.

The prior art ladder-method installation technique for multi-sections vertically acting type doors (DD) requires installing into trackway vertical lengths TV1 and TV2 the sections S1–Sn in ascending order, starting with bottom-section S1, then with medial-sections S2 . . . S(n−1), and finally with top-section Sn e.g. S5. With the prior art ladder-method, the workman is required to tediously and repetitively position, climb, descend, and re-position a ladder, and including lugging the heavy door sections S3, S4 . . . Sn up the ladder. Hence, the prior art ladder-method suffers from the disadvantages of tediousness and coincident high labor costs, the danger of falling ladders, and the inability of all but vigorously endowed youthful workmen to perform the door installation task.

OBJECT OF THE INVENTION

It is the general objective of the present invention to provide novel method and ancillary apparatus for installing vertically acting overhead type doors and that does not require the workman to utilize ladders at the installation site, and thereby circumventing the several disadvantages and deficiencies of the prior art ladder-method installation technique.

SUMMARY OF THE INVENTION

As alluded to in the FIG. 2 flow diagram, the novel hoisting method installation technique of the present invention does not require use of a ladder, but rather the workman at all times remains standing safely and comfortably at ground level. The hoisting method installation of a door DD having sections S1–Sn might be generally summarized as follows and for the representative (though non-limiting) situation wherein there are five door sections e.g. Sn=S5:

a. as alluded to in drawing FIGS. 3 and 4, uprightly positioning bottom-section S1 at bottom-border DB and into engagement (M1, M2, R1) with trackway vertical lengths TV1 and TV2;

b. uprightly suspending door top-section Sn (e.g. S5) from the left-bracket AB1 and right-bracket AB2 of hoisting apparatus (A) branched liftcable AY that is actuated by a dual-directional winch means AW, said top-section S5 being in rollable engagement (R4) with trackway vertical lengths TV1 and TV2;

c. as alluded to in drawing FIGS. 3 and 4, hoisting the top-section S5 a lofty-gap LG above said previously uprightly positioned bottom-section S1;

d. as alluded to in drawing FIG. 5, positioning the door uppermost medial-section S(n−1) e.g. S4, uprightly upon said previously uprightly positioned bottom-section S1, and pivotably attaching said medial-section S4 to top-section S5 with hinges P4 and R4;

e. as alluded to in drawing FIG. 6, hoistably suspending top-section S5 and pivotably attached uppermost medial-section S4 a lofty-gap LG above said previously uprightly positioned bottom-section S1;

f. positioning the door next lower medial-section S(n−2) e.g. S3 uprightly upon said previously uprightly positioned bottom-section S1, and pivotably attaching said medial-section S3 to the medial-section thereabove (S2) with hinges P3 and R3;

g. repeating the steps e and f in order, and terminating with the lowermost medial-section S2; and thereafter h. pivotably attaching said uprightly positioned bottom-section S1 to the lowermost medial-section S2 and utilizing hinges P1 and R1, and removing the brackets AB1 ad AB2 from the door top-section S1.

BRIEF DESCRIPTION OF THE DRAWINGS

In the drawing, wherein like characters refer to like parts in the several views, and in which:

FIG. 2 is the aforedescribed schematic flow diagram that generally indicates the steps for installing the FIG. 1 representative door by the novel hoisting method of the present invention;

DETAILED DESCRIPTION OF THE DRAWINGS

Figure 1:
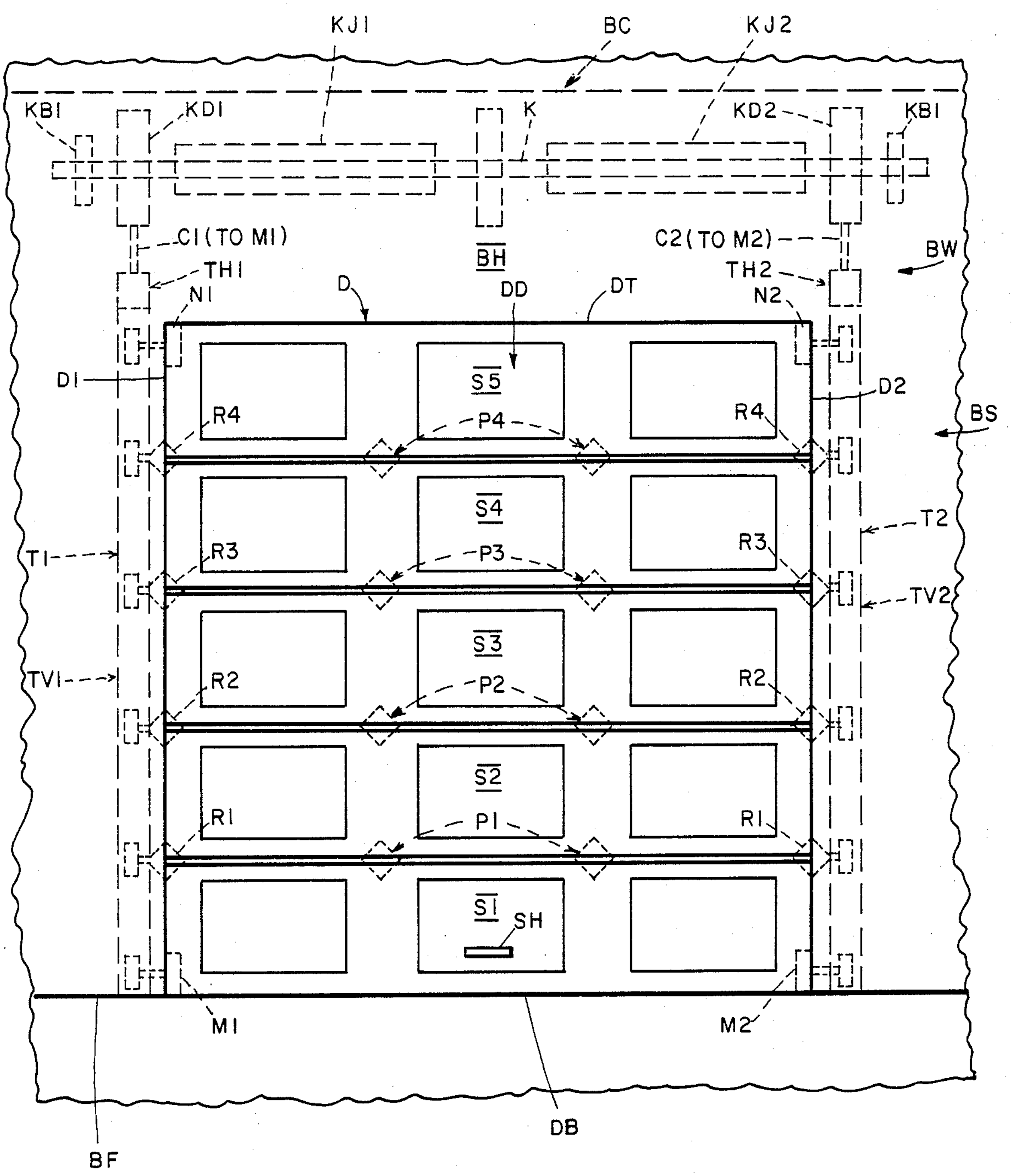
FIG. 1 (Prior Art)
FIG. 1 is the aforedescribed external elevational view of a representative embodiment of the prior art multi-sections vertically acting overhead type door which can be installed by either the prior art ladder-method or by the improved hoisting method of the present invention.
Figure 4:
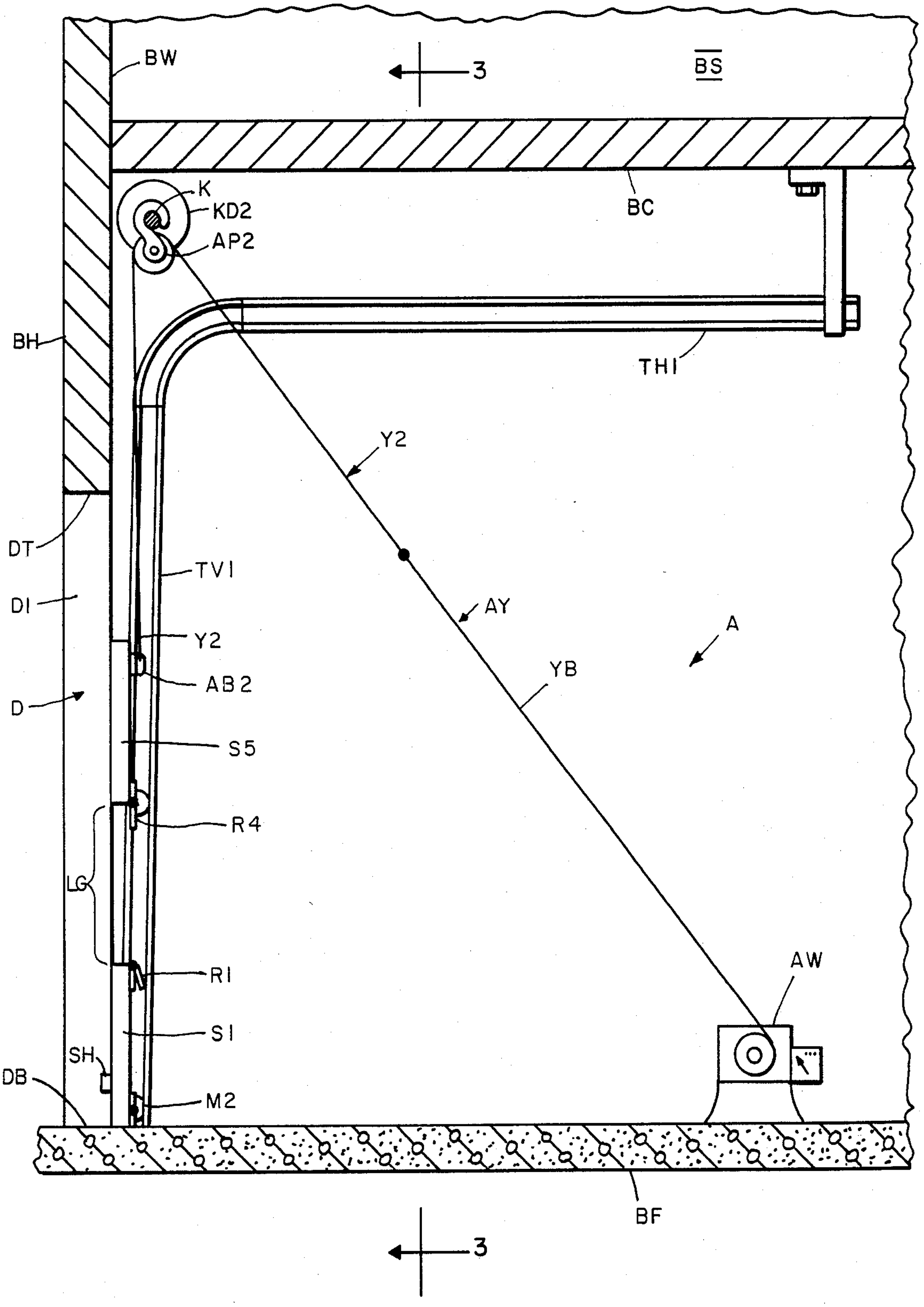
FIG. 4 is a sectional elevational view taken along line 4—4 of FIG. 3.

The novel hoisting method of the present invention requires use of an appropriate ancillary hoisting apparatus, such as that generally indicated by reference character A and comprising:

i. longitudinally separated and co-elevational pulley support means attached to the structural header BH and located above the door opening top-border DT. Such pulley support means might take the form of those two lengths of shaft K disposed between drum KD1 and bearing plate KB1 and between drum KD2 and bearing plate KB2;

ii. a right-pulley (AP1) and a left-pulley (AP2) removably attached to said respective pulley support means;

iii. a dual-directional winch means AW supported above the structural flooring BF remote of the door opening plane and preferably internally of the building structure BS. As schematically indicated in FIG. 4, such winch means AW might be of conventional electrically powered type having a dual-directional switching control; and iv. a Y-shaped liftcable AY comprising right-length branch Y1 and left-length branch Y2 diverging from an inclined base-length YB engaged with dual-directonal winch means AW. Liftcable right-length Y1 is engaged with right-pulley AP1 and extends vertically downwardly alongside door right-border D1 and ultimately terminating at right-bracket AB1. Liftable left-length Y2 is engaged with left-pulley AP2 and then extends vertically downwardly alongside left-border D2 and ultimately terminating at left-bracket AB2. Right-bracket AB1 and left-bracket AB2 are removably attached to door top-section S1 a few inches directly below the intended position for rollers N1 and N2, and nearer thereto to top-section roller-hinges R4.

Figure 3:
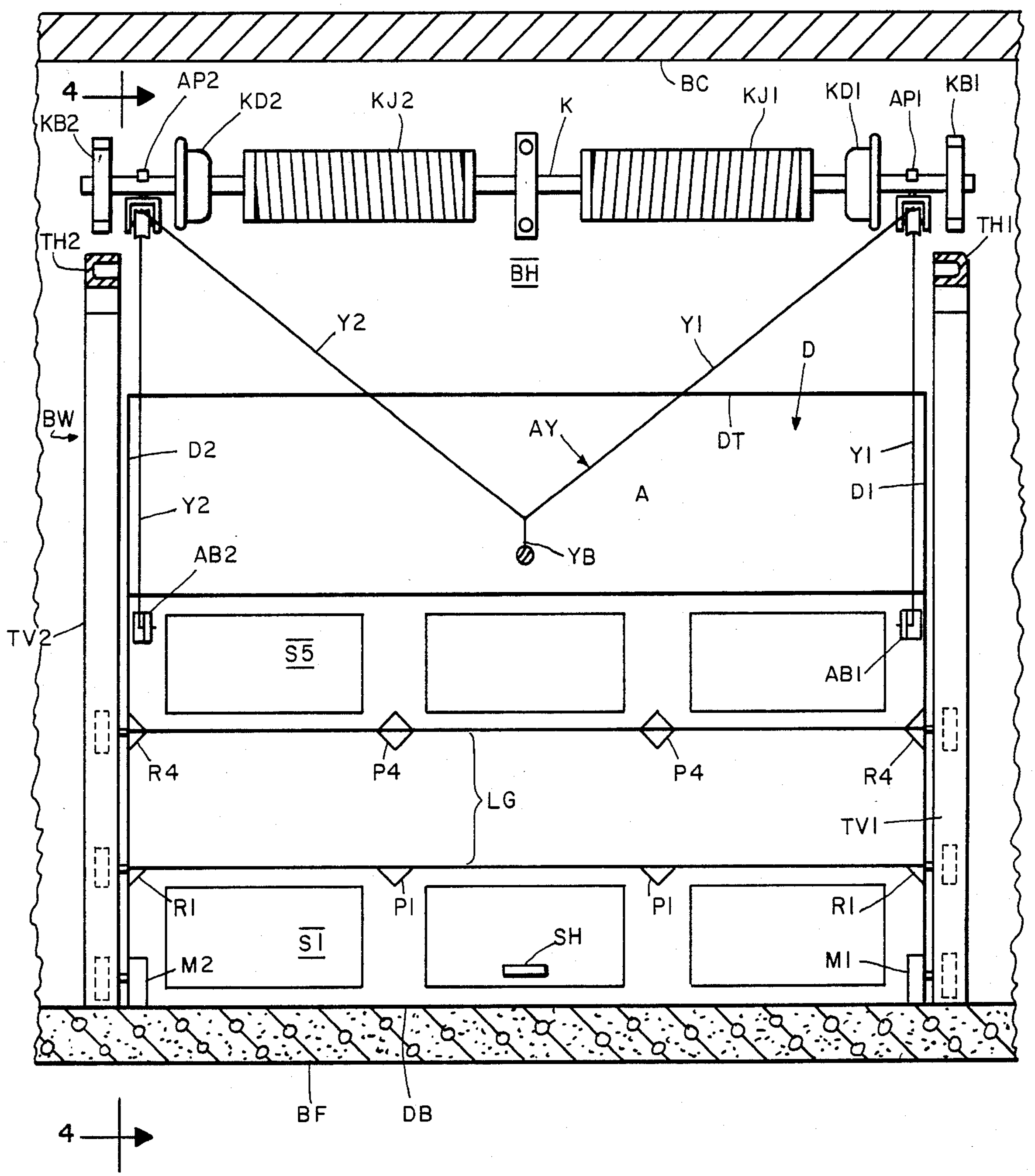
FIG. 3 is an internal elevational view of an early method step outlined in FIG. 2 and toward the goal of a FIG. 1 installed door.

As shown in drawing FIGS. 3 and 4, door bottom-section S1 is uprightly installed in level condition along door opening bottom-border DB, and including into engagement (M1, M2, and roller-hinges R1) with trackway vertical lengths TV1 and TV2. The upper-edge of bottom-section S1 is provided with inboard hinges P1. Utilizing roller-hinges R4 (but not rollers N1 and N2), the liftcable-suspended top-section S5 is effected into rollable engagement with trackway lengths TV1 and TV2; the lower-edge of top-section is provided with inboard hinges P4. Winch means AW is controlled to pull liftcable base-length YB sufficiently to hoist top-section S5 a lofty-gap LG above said uprightly positioned bottom-section S1, lofty-gap LG exceeding the vertical height of door topmost medial-section S4.

Figure 5:
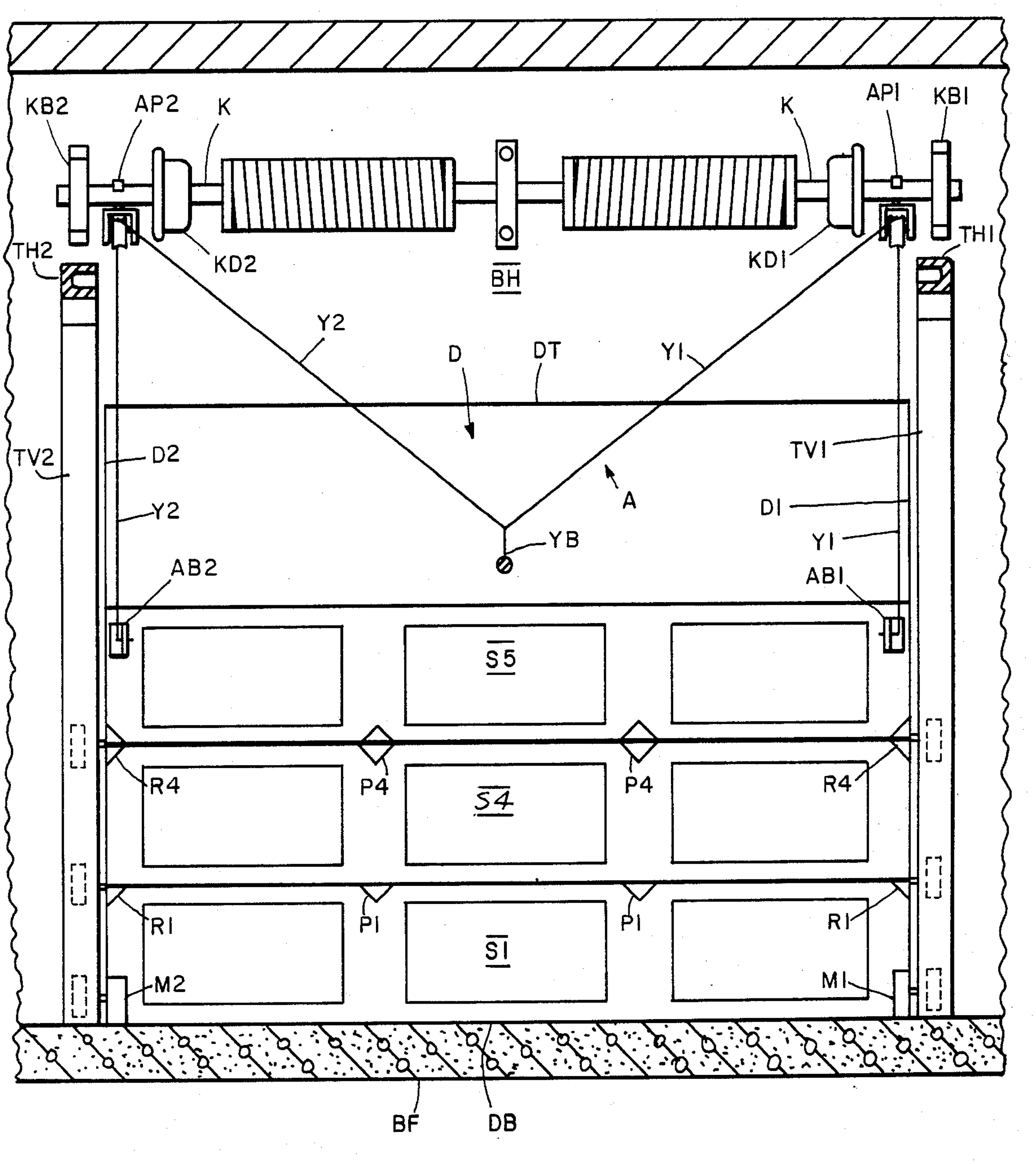
FIG. 5 is an internal elevational view of a later method step outlined in FIG. 2 and toward the goal of a FIG. 1 installed door.

Turning now to drawing FIG. 5. As the winch means AW is braked to maintain lofty-gap LG, the floor level standing workman manually lifts uppermost medial-section S4 and places it uprightly upon the upper-edge of previously installed bottom-section S1. Immediately, the winch means AW is controlled to pay out sufficient liftcable Y whereby the lower-edge of suspended top-section S5 is caused to abut along the upper-edge of uppermost medial-section S4 whereupon the workman can pivotably attach door sections S5 and S4 utilizing roller-hinges R4 and inboard hinges P4 depending from top-section S5. Then, along the lower-edge of uppermost medial-section S4, the workman attached inboard hinges P3 and roller-hinges R3, the latter being rollably engaged within trackway vertical lengths TV1 and TV2.

Figure 6:
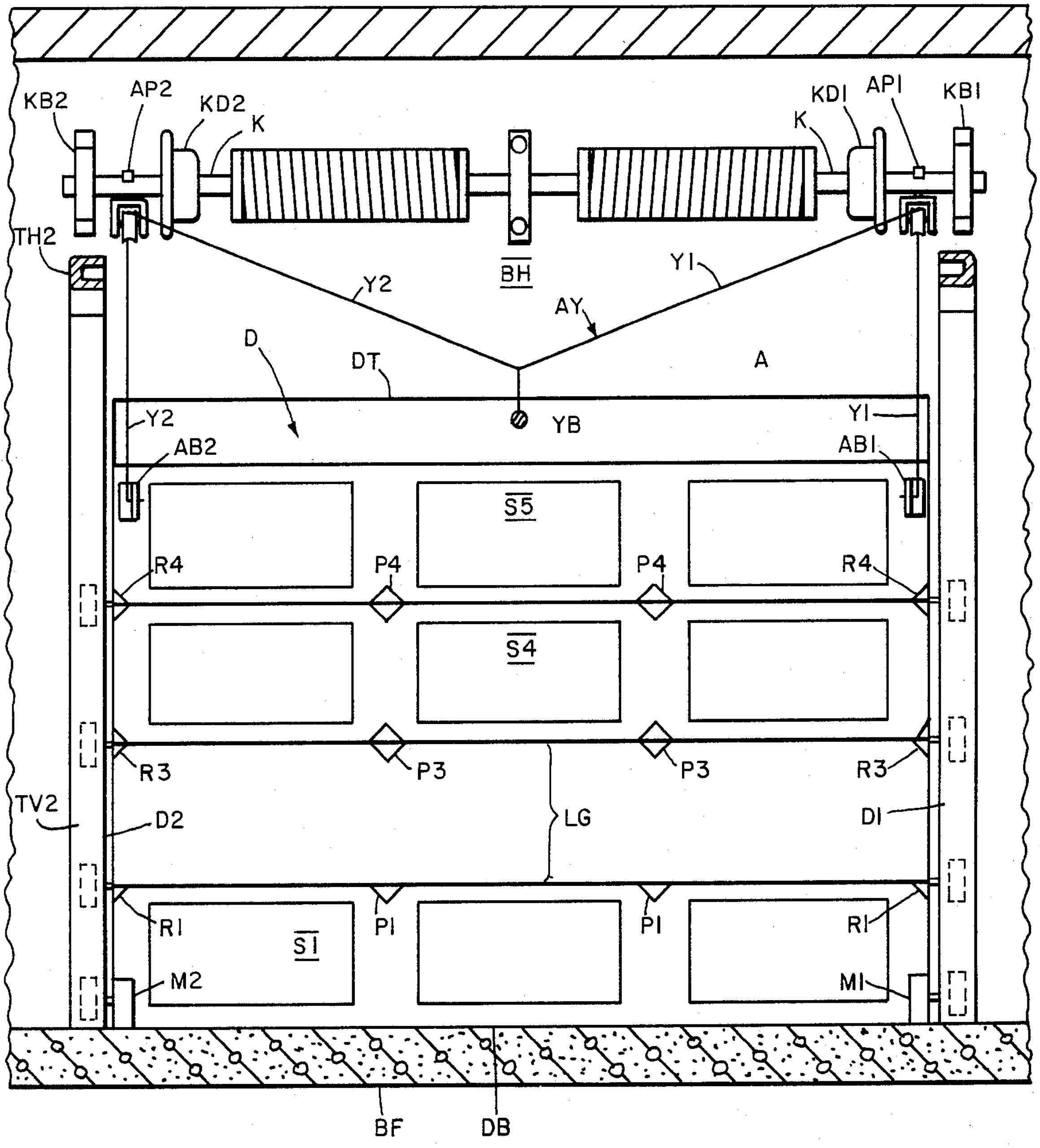
FIG. 6 is an internal elevational view of a still later method step outlined in FIG. 2 and toward the goal of a FIG. 1 installed door.

Turning now to drawing FIG. 6. Winch means AW is controlled to pull liftcable base-length YB to hoist the pivotably attached combination of top-section S5 and uppermost medial-section S4 sufficiently whereby a lofty-gap LG exists between the lower-edge of medial-section S4 and the upper-edge of uprightly positioned bottom-section S1. Lofty-gap LG exceeds the vertical height of next lower medial-section S3.

As indicated in box #6 of the FIG. 2 schematic flow diagram, the procedure recited in the two immediately preceeding paragraphs is repeated at least twice, once for each of the remaining medial-sections to be installed.

Specifically herein, the first repition is as follows. As the winch means AW is braked to maintain the lofty-gap LG of FIG. 6, the floor level standing workman manually lifts next lower medial-section S3 and places it uprightly upon the upper-edge of previously installed bottom-section S1. Immediately, the winch means AW is controlled to pay out sufficient liftcable Y whereby the lower-edge of suspended uppermost medial-section S4 is caused to abut along the upper-edge of next lower medial-section S3 whereupon the workman can pivotably attach door medial-sections S4 and S3 utilizing roller-hinges R3 and inboard hinges P3 depending from medial-section S4. Then, along the lower-edge of next lower medial-section S3, the workman attached inboard hinges P2 and roller-hinges R2, the latter being rollably engaged within trackway vertical lengths TV1 and TV2. The winch means is controlled to pull liftcable base-length YB to hoist the pivotably attached combination of sections S5,S4, and S3 sufficiently to provide a lofty-gap (exceeding the height to medial-section S2) between the lower-edge of medial-section S3 and the upper-edge of uprightly positioned bottom-section S1.

Specifically herein, the second repitition is as follows. As winch means AW is braked to maintain the lofty-gap between medial-section S3 and bottom-section S1, the floor level standing workman manually lifts next sequential medial-section S2 and places it uprightly upon the upper-edge of previously installed bottom-section S1. Immediately, the winch means AW is controlled to pay out sufficient liftcable Y whereby the lower-edge of suspended next lower medial-section S3 is caused to abut along the upper-edge of sequentially lower medial-section S2 whereupon the workman will pivotably attach door medial-section S3 and S2 utilizing roller-hinges R2 and inboard hinges P2 depending from medial-section S3. Then, along the lower-edge of medial-section S2, the workman attaches inboard hinges and roller-hinges, the latter being rollably engaged within trackway vertical lengths TV1 and TV2. Since the third (from the uppermost) medial-section in the depicted door happens to be also the lowermost suspended medial-section, the inboard hinges and the roller-hinges for the lower-edge of lowermost medial-section are furnished along the upper-edge of previously uprightly installed bottom-section. In the depicted door, the inboard hinges P1 and roller-hinges R1 from bottom-section S1 are attached to the third (and herein lowermost) medial-section S2. The winch means is controlled to temporarily lift all five pivotably attached sections S5–S1 a few inches above flooring BF to permit attachment of doorcable C1 between drum KD1 and roller M1 and doorcable C2 between drum KD2 and roller M2.

There being no further use for hoisting apparatus A, it is now dismantled from the door environment, by removing right-bracket AB1 and left-bracket AB2 from door top-section S5, and by removing right-pulley AP1 and left-pulley AP2 from overhead shaft K. At this time, rollers N1 and N2 are attached to the two upper corners of top-section S5 and including into rollable engagement with the trackway vertical lengths TV1 and TV2, respectively. Accordingly, the vertically acting overhead type door structure D alluded to in FIG. 1 has been installed according to the aforedescribed novel hoisting method of the present invention.

From the foregoing, the hoisting method and apparatus for installing multi-sections vertically acting overhead type doors of the prior art will be readily understood and further explanation is believed to be unnecessary. However, since numerous modifications and changes in the method and ancillary hoisting apparatus will readily occur to those skilled in the art, it is not desired to limit the invention to the exact mode described, and accordingly, further modifications and equivalents may be resorted to, as falling within the scope of the appended claims.

What is claimed is as follows:

1. Method for installing a multi-sections vertically acting overhead type door for a vertically extending rectangular door opening of a building structural wall, said door opening having a floor as its horizontal bottom-border, a wall header as its horizontal top-border, and longitudinally separated and vertical left-border and right-border, said overhead type door comprising a plurality of vertically aligned and longitudinally horizontally extending upright sections pivotably attached together and including a bottom-section, a top-section, and a plurality of intervening medial-sections, said method comprising the following steps:

A. attaching vertical trackway lengths to the structural wall alongside the door opening left-border and right-border;

B. attaching longitudinally separated pulley support means to the wall header above the door opening;

C. providing a hoisting apparatus by: attaching a left-pulley and a right-pulley in removable condition to said pulley support means, engaging the left-length and the right-length of a Y-shaped liftcable with said left-pulley and right-pulley, engaging the liftcable base-length with a floor supported dual-directional winch means, and attaching left-bracket and right-bracket to depending portions of said liftcable left-length and right-length;

D. positioning the door bottom-section uprightly at the door opening bottom-border and into rollable engagements with the vertical trackway lengths;

E. uprightly suspending the door top-section from the left-bracket and right-bracket terminii of said hoisting apparatus, said top-section being in rollable engagement with said vertical trackway lengths;

F. hoisting the top-section a lofty-gap above said uprightly positioned bottom-section;

G. positioning the door uppermost medial-section uprightly upon said bottom-section and pivotably attach and medial-section to the top-section, said uppermost medial-section being in rollable engagement with the vertical trackway lengths;

H. hoistably suspending the top-section and pivotably attached uppermost medial-section a lofty-gap above said uprightly positioned bottom-section;

I. positioning the door next lower medial-section uprightly upon said bottom-section and pivotably attach said medial-section to the medial-section thereabove, said next lower medial-section being in rollable engagement with the vertical trackway lengths;

J. repeating steps H and I in order, and terminating with the lowermost medial-section in said suspended condition; and K. pivotably attaching said uprightly positioned bottom-section to the lowermost suspended medial-section, and removing the left-bracket and right-bracket from the door top-section.

2. The method of claim 1 wherein the left-bracket and right-bracket terminii of the hoisting apparatus are removably attached at longitudinally separated and substantially co-elevational locations of the door top-section, said co-elevational locations being a few inches below the top-section longitudinally extending horizontal upper-edge and nearer thereto than to the top-section lower-edge.

3. The method of claim 1 wherein the longitudinally separated pulley support means is provided by attaching a longitudinally extending horizontal shaft to said header and including shaft engaged and longitudinally separated left-drum and right-drum; and wherein the left-pulley is removably engaged to said horizonal shaft immediately adjacent to said left-drum and the right-pulley is removably engaged to said horizontal shaft immediately adjacent to said right-drum and in condition whereby both said drums intervene between left-pulley and right-pulley.

4. The method of claim 3 wherein after the left-bracket and right-bracket are removed from the door top-section: a leftward vertical doorcable is engaged between the left-drum and the lowerleft corner portion of the bottom-section and a rightward vertical doorcable is engaged between the right-drum and the lower-right corner portion of the bottom-section; and the entire hoisting apparatus is removed from the door and door opening environment, including disengaging the left-pulley and the right-pulley from the header attached pulley support means.

* * * * *